(12) United States Patent
Gaber

(10) Patent No.: US 6,608,298 B2
(45) Date of Patent: Aug. 19, 2003

(54) SELF-CONTAINED DAY/NIGHT OPTICAL SIGHT

(75) Inventor: Leonid Gaber, South San Francisco, CA (US)

(73) Assignee: American Technologies Network Corporation, Inc.

(*) Notice: Subject to any disclaimer, the term of this patent is extended or adjusted under 35 U.S.C. 154(b) by 107 days.

(21) Appl. No.: 09/999,447

(22) Filed: Dec. 3, 2001

(65) Prior Publication Data

US 2003/0102431 A1 Jun. 5, 2003

(51) Int. Cl.$^7$ ................................. H01J 40/14
(52) U.S. Cl. ................... 250/214 VT; 250/239
(58) Field of Search ............... 250/214 VT, 214 R, 250/239, 216; 313/103 R, 103 CM, 105 CM, 524–528, 542–544

(56) References Cited

U.S. PATENT DOCUMENTS

| 4,629,295 A | 12/1986 | Vogl |
| 4,822,994 A | 4/1989 | Johnson et al. |
| 4,961,278 A | 10/1990 | Johnson et al. |
| 5,084,780 A | 1/1992 | Phillips |
| 5,902,996 A | 5/1999 | Sauter |
| 5,946,132 A | 8/1999 | Phillips |
| 6,131,294 A | 10/2000 | Jibiki |
| 6,204,961 B1 * | 3/2001 | Anderson et al. ............ 359/353 |

* cited by examiner

Primary Examiner—Que T. Le

(57) ABSTRACT

The self-contained day/night optical sight device of the invention has a sealed sight housing permanently attached to the weapon or to other object and containing an objective lens and an eyepiece lens installed on a common optical path at a distance from each other so that a space is formed between the both. The same sealed housing pivotally supports a night-vision unit, such as an image-intensifier tube, which can be turned in the plane that contains the optical axis of the sight between the position offset from the aforementioned common optical axis and the position coincident with this optical axis. Since both the night-vision and day-vision optics are located in a sealed housing, the lenses are protected from contamination and fogging. The use of a single optical path makes it possible to reduce the weight of the system. Rotation of the night-vision unit to the working position is interlocked with the day-vision optics so that switching of the sight to night-vision conditions will automatically shift the daytime optics back for a distance required for matching both optics.

26 Claims, 3 Drawing Sheets

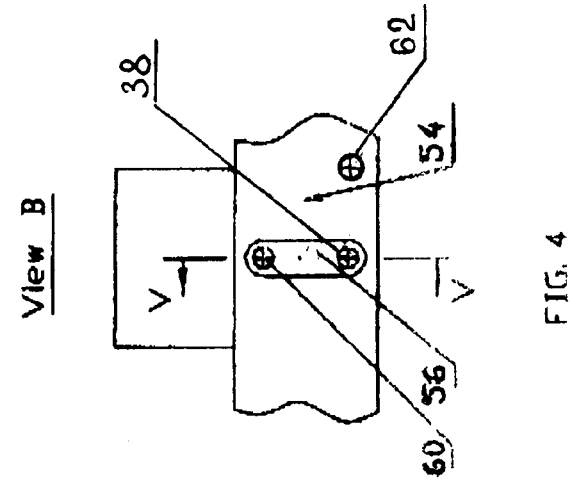
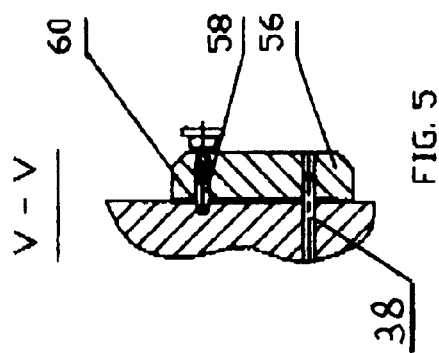
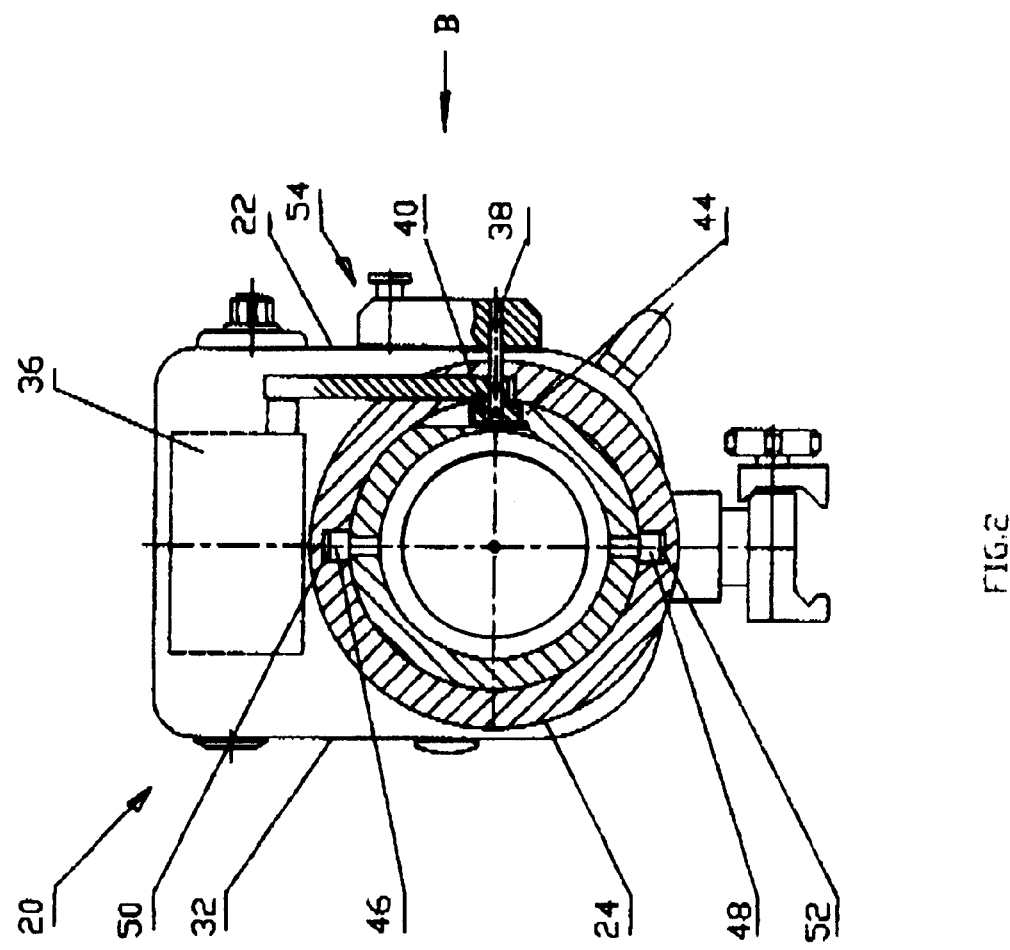

SELF-CONTAINED DAY/NIGHT OPTICAL SIGHT

FIELD OF INVENTION

The present invention relates to optical sights, in particular to telescopic optical sights equipped with a switchable image intensifier tube, which can be switched between the non-operative position for use of the telescopic optical sight alone or to an operative position in which the tube can be used in combination with the telescopic sight for enhancing operation of the latter.

BACKGROUND OF THE INVENTION

There exist a great variety of optical sights of different types, in particular for application on hunting, combat, or training weapons. In general a sight is utilized for aiming a weapon during daytime operation at a directly visible target and during nighttime operation at a target, which is only visible through the use of some vision-aiding devices.

Daytime sight devices range from simple front and rear sights like those on ordinary rifles to complex optical systems in combination with laser range finders and laser aiming devices. Certain sophisticated types such as telescopes are utilized to magnify a target and to enable the user during normal daytime operation to view a magnification of the target area at which the viewer is aiming.

There are also nighttime vision devices or sights, which employ image intensifiers or similar structures. The function of an image intensifier is to multiply the amount of incident light received by it to produce a signal that is bright enough for presentation to the eyes of a viewer. As such, these devices have been employed by the military and in commercial products as well. Sights vary in size, magnification, type of reticle, weapon application and level of performance.

An image intensifier tube (IIT) is a vacuum photoelectronic device intended either for transformation of an invisible IR, UV, or X-ray image of an object into a visible image or for intensification of a visible image. An IIT normally consists of a photocathode, an image intensification system, and a cathode-luminescent screen. The photocathode transforms the original optical image into a so-called electronic image. With the use of the image-intensifying system, the electronic image is transferred to the screen where this image, in turn, is converted into a visible original image. In the IIT, the light reflected from the object causes emission of electrons (photocurrent) from the surface of the photocathode. In this case, a magnitude of photocurrent generated by various areas of the photocathode depends on distribution of density of images projected onto these areas. Photoelectrons accelerated and focused by the IIT's field, bombard the screen, thus causing it to luminesce. Since brightness on individual areas of the screen depends on density of the photocurrent, the screen reproduces a visible image of the object.

In its simplest form an IIT consists of two parallel electrodes, i.e., a photocathode and a screen, between which a voltage is applied. In a uniform electrostatic field of such an IIT, electrons are practically not focused (the electrons move along parabolas having parameters dependent on initial velocities of the electrons). For focusing of electrons, the IIT with a uniform electrostatic field is placed into a uniform magnetic field having the same direction as the electric field. In this case, the electrons emitted from individual points of the cathode begin to move along periodically converging spiral paths rather than along the diverging parabolas. The use of immersion-type electrostatic lenses makes it possible to obtain a good electronic image, even without the use of a magnetic field.

In an IIT, intensification of the original image is achieved due to additional acceleration imparted to the electrons as well as due to compression of the electronic image. In this case, brightness is also increased with a factor of $1/B^2$, where B is an optoelectronic magnification. Brightness is increased with the use of a multiple-stage IIT, which comprises several IITs connected in series. From the screen of the first IIT, a luminous flow is directed to a photocathode of the second IIT, etc. Normally, multiple-stage IITs are encapsulated into a common shell. In order to prevent significant loss in resolution capacity, a thickness of a transparent partition between the stages should not exceed 5 to 10 μm.

Application of optical fiber plates makes it possible to connect individual IITs via direct optical contact between the surfaces of the plates. Multiple-stage IITs provide the maximum possible amplification of brightness when the output cathode-luminescent screen reproduces elements separately emitted from the photocathode. An IIT with a microchannel plate provides intensification of brightness close to the maximum possible limit. A microchannel plate is a glass plate with several million channels (having diameters within the range of 5 μm to 15 μm) with a voltage of about 1 kV applied to the end faces of this plate. In such an IIT, the electronic image is aligned with an input surface of the microchannel plate and is divided by the channels into separate elements. On its way through the channels, the electron flow of each element is multiplied by $10^3$ to $10^4$ times due to secondary emission of electrons caused by collision of the electrons with the walls of the channels. The obtained electronic image of increased density is transferred to the screen.

A basic parameter of an IIT is an integral sensitivity, which is a ratio of the photocurrent to a value of a light flow incident on the photocathode. For example, in an IIT with an oxygen-silver-cesium cathode intended for conversion of images in infra-red rays with the wavelength of 1.3 μm, image sensitivity may reach 50 mkA/lumen. A multiple-alkaline photocathode which contains compounds of Sb with Cs, K, and Na and which is used in IIT for amplification of a visible image, provides integral sensitivity up to 400 mkA/lumen. Other basic parameters are a resolution capacity (which is determined by the amount of separately seen black-and-white lines or dots per unit of length and which is within the range of 25 to 60 $mm^{-1}$, or higher); a coefficient of transformation (a ratio of the luminous flow emitted from the screen to the luminous flow incident on the photocathode and which reaches several hundred in single-stage IITs and $5 \times 10^4$ in multiple-stage IITs; and time resolution, which in latest IITs reaches $10^{-12}$ sec. Among other applications, the parameters listed above make it possible to use IITs also in night-vision systems, such as optical arm sights, as well as in range finders utilizing back-light systems for pulse illumination of objects, where illumination pulse may have time resolution of up to $10^{-12}$ sec.

In general, an IIT alone is unsuitable for use as an optical sight because search of remote targets requires optical magnification and superposition of the target image onto the photocathode of the IIT. The above function is fulfilled by an objective lens, which isolates the area of interest and magnifies the target found in this area. Matching of the image reproduced by IIT with the pupil of the viewer's eye requires the use of an eyepiece. Thus, the IIT used in the optical sight comprises a complex optoelectronic system, which consists of an IIT per se, an objective lens unit, an eyepiece lens unit, and electronics.

Since it is advantageous to use the same weapon with the daytime and nighttime vision devices, many contemporary weapons are provided with possibility of installing both a daytime or nighttime sights.

For example, U.S. Pat. No. 4,822,994 discloses a configuration in which the front end of a telescopic sight is separable from the rest of the sight. For nighttime use an image intensifier module is inserted between the sections. However, for daytime operation, the user must disassemble the sight and remove and store the image intensifier module.

U.S. Pat. No. 4,629,295 is directed to another type of night viewing device, which is an add-on accessory to day rifle sights. This device is attached directly to the day rifle scope. It includes an objective assembly, which receives the image and directs it to a night vision device. The intensified image is then directed to the day sight for viewing. Again, the device is bulky and must be carried by the user or stored during daytime operations.

One disadvantage to having separate daytime and nighttime sights is that the sights must be individually boresighted to the weapon whenever the sight is initially installed, and must be checked for boresight whenever the sight is reinstalled on the weapon. Current use of weapon sights by law enforcement and military personnel and by civilian users involves the careful mounting and boresighting of a day and/or night vision sight to the weapon. For maximum accuracy, actual firing of the weapon is required during the boresighting process. This is not generally feasible under combat conditions. Separate weapon sights are also disadvantageous because the sights must be interchanged for day or night use. In addition, the separate night vision sight adds an additional three to four pounds, which must be carried and handled separately by the user.

On the other hand, it is understood that the lenses of the objective lens unit and of the ocular lens unit may form a conventional optical daytime sight, which comprises a conventional telescopic tube with adjustable magnification. It is obvious that such daytime conventional telescopic sight can be combined with a night vision device such as IIT to form a self-contained device, and a great variety of optical sight systems which can at the same time be used both in daytime and nighttime merely by switching and without disconnection have recently appeared on the market and became a subject of new patents.

For example, U.S. Pat. No. 5,084,780 issued in 1992 to E. Phillips and U.S. Pat. No. 5,946,132 issued to the same inventor in 1999 disclose a telescopic sight which can be used for either nighttime or daytime operation and is particularly adaptable for use on weapons ranging from rifles to anti-tank weapons. A first embodiment includes a single objective and two parallel light paths, one for day viewing and one for night viewing. The objective forms the beginning of the night path. Separating dichroic mirrors transmit light from the objective along the night path and reflects light from the objective to the day path. The night path includes an IIT. A mirror at the end of the night path reflects the light from the IIT to a beamsplitter/combiner on the day path. The beamsplitter/combiner transmits the light from the day path and reflects the light from the night path along the same path to an ocular assembly for viewing. A second embodiment of the telescopic sight is similar to the first embodiment but contains two objective lens assemblies for collecting light, one for the night path and one for the day path. Because the sight has two separate objective lens assemblies, separating mirrors are not included. A third embodiment includes a projected aiming reticle and a direct view capability for day viewing which replaces one of the objective lens assemblies. The direct view channel includes a beamsplitter/combiner.

Furthermore, both patents of Phillips describe various methods for introducing an image of a reticle to the combined day and night optical path.

In spite of all advantages of the aforementioned optical sight system, it utilizes two parallel optical paths always used simultaneously irrespective of nighttime or daytime application. It is obvious that the use of two separate optical paths at the same time makes the sight optics large and heavy, which is a significant drawback for weapons, which are manually carried by the user.

The device based on the same principle of simultaneous and constant use of daytime and nighttime optical paths is disclosed in another U.S. Pat. No. 5,902,996 issued in 1999 to K. Sauter. This device is provided with two rotating mirrors, which can be rotated simultaneously for opening or closing the night vision system. Although this system is more reliable than the previous one, in general it entails the same disadvantages since it does not suggest any other new solutions of the problems inherent in the sight with two parallel and simultaneously working optical paths.

The above problem is solved by the system described in U.S. Pat. No. 6,131,294 issued in 2000 to U. Jibiki. This device comprises a telescopic sight with a small separate night-vision block insertable into the daytime optical path between the ocular lens and the objective lens. A special recess is formed in the sight housing for fitting the insertable block into this recess with alignment of the optical path of the night-vision insert with that of the daytime sight portion. Insertion is carried out without the use of any special instruments or fasteners.

Although the U.S. Pat. No. 6,131,294 solves the problems of the earlier described devices by providing a single-path day/night vision optics, it is still possesses a number of significant disadvantages, which are the following.

Disconnection of the night-vision device, such as image intensifier, exposes two optical surfaces on the opposite sides of the recess. During the use of the sight in the daytime mode these optical surfaces remain unprotected. Penetration of scattered day light into the aforementioned recess contributes to decrease in contrast of the image. Furthermore, the night-vision device, such as an image intensifier tube, is a very delicate optical instrument, which requires accurate handling after replacement. Therefore the use of the device of U.S. Pat. No. 6,131,294 is unsuitable for combat field conditions.

When the night vision insert has a temperature different from the temperature of the stationary part of the sight, insertion of the night-vision block may cause fogging of the sight optics, which can make the sight inoperative for a substantial period of time.

Another problem associated with the use of the insertable night-vision block consists in that each insertion and removal requires readjustment of the optical system for refocusing.

U.S. Pat. No. 4,961,278 issued in 1990 to Ch. Johnson, et al., describes a sight apparatus for selective daytime and nighttime use due to a provision of a rotating housing located between the ocular and objective of the telescopic sight assembly. This housing contains an image intensifier unit for night time use and lens coupling assembly for daytime use which are rigidly attached to opposite arms of a two-arm lever so that rotation of this level by about 180° will alternatingly align the optical axis of the sight either with the image intensifier unit or with the daytime lens coupling assembly which is placed in the optical path of the sight. A disadvantage of this device consists in that in addition to an image intensifier unit it requires the use of an auxiliary daytime coupling assembly, which both have to be attached to opposite arms of a pivotable lever. The use of the auxiliary daytime coupling contributes to an increase in the weight of the sight. Furthermore, as the coupling assembly and the image intensifier have diametrically opposite positions and the lever that supports these units has to be rotated by 180°, in order to have enough room for such rotation the sight should have increased overall dimensions. Moreover, switching between the daytime optics and nighttime optics requires manual focusing and magnification with the use of a focusing and magnification mechanisms. Another disadvantage of the design described in the aforementioned patent is that switching between the daytime use and the nighttime use requires rotation of the aforementioned lever with the entire housing and with switchable optics respective to the sight housing. This means that the housing of the sight consists of two separate parts, one of which is rotatingly installed on the other. Another essential disadvantage of the sight disclosed by he aforementioned patent consists in that arrangement of rotatable optics for rotation in a plane perpendicular to the optical axis of the sight. Such an arrangement contributes to an additional significant increase in the sight dimensions because for efficient operation the image intensifier requires a high aperture ratio and this, in turn, requires the use of electropotics of large diameter. This leads to an increase in a vertical dimension of the sight.

OBJECTS AND SUMMARY OF THE INVENTION

It is an object of the present invention to provide an integral day/night optical sight, which is simple in construction, small in size, light in weight, utilizes a single optical path with the minimal number of lenses, does not change the temperature of the sight when the night-vision block is installed into the optical path of the daytime optics, does not require disconnection of the night-vision unit from the sight housing, provides reliable operation in day and night modes, and automatically readjusts sections of the optical paths when the night-vision unit is switched between the daytime and nighttime operation positions. Another object is to provide a self-contained day/night sight in which switchable nighttime optics and daytime optics are located in a single housing. Still another object is to provide the sight of the aforementioned type, which does not require the use of any optical compensation units for switching between the daytime and nighttime use.

The self-contained day/night optical sight device of the invention has a sealed sight housing permanently attached to the weapon or to other object and contains an objective lens and an eyepiece lens installed on a common optical path at a distance from each other so that a space is formed between the both. The same sealed housing pivotally supports a night-vision unit, such as an image-intensifier tube, which can be turned in the plane that contains the optical axis of the sight between the position offset from the aforementioned common optical axis and the position coincident with this optical axis. Since both the night-vision and day-vision optics are located in a sealed housing, the lenses are protected from contamination and fogging. The use of a single optical path makes it possible to reduce the weight of the system. Rotation of the night-vision unit to the working position is interlocked with the day-vision optics so that switching of the sight to night-vision conditions will automatically shift the daytime optics back for a distance required to match both optics.

BRIEF DESCRIPTION OF THE DRAWINGS

FIG. 2 is a sectional view along the line II—II of FIG. 1.

FIG. 4 is a view on the part of the optical sight in the direction of arrow B.

FIG. 5 is a fragmental sectional view along the line V—V in FIG. 4 illustrating a mechanism for locking the rotatable night-vision unit in operative and inoperative positions.

DETAILED DESCRIPTION OF THE INVENTION

Figure 1:
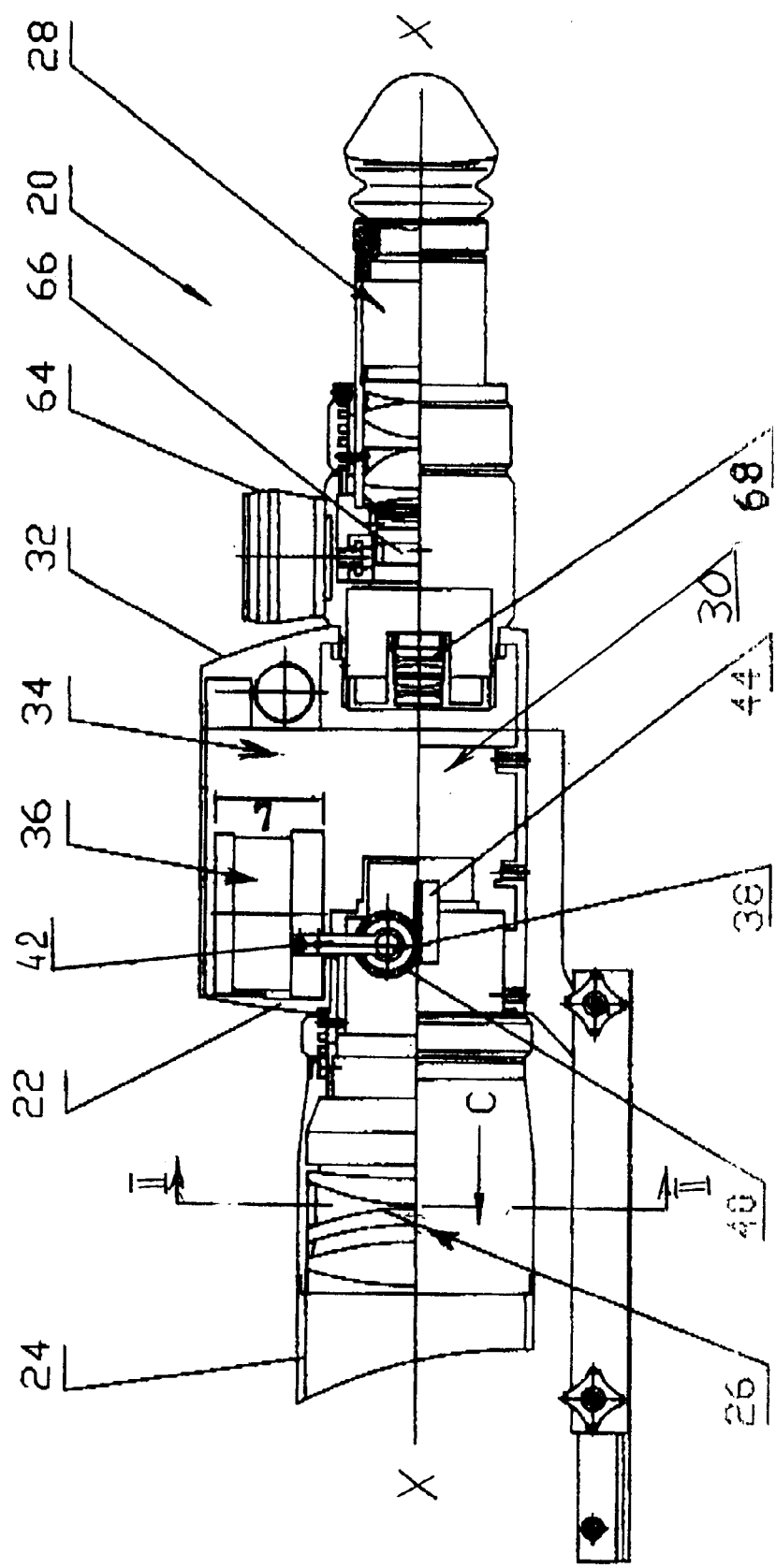
FIG. 1 is a longitudinal sectional view of the self-contained day/night optical sight of the invention in an inoperative position of the night-sight unit.
Figure 3:
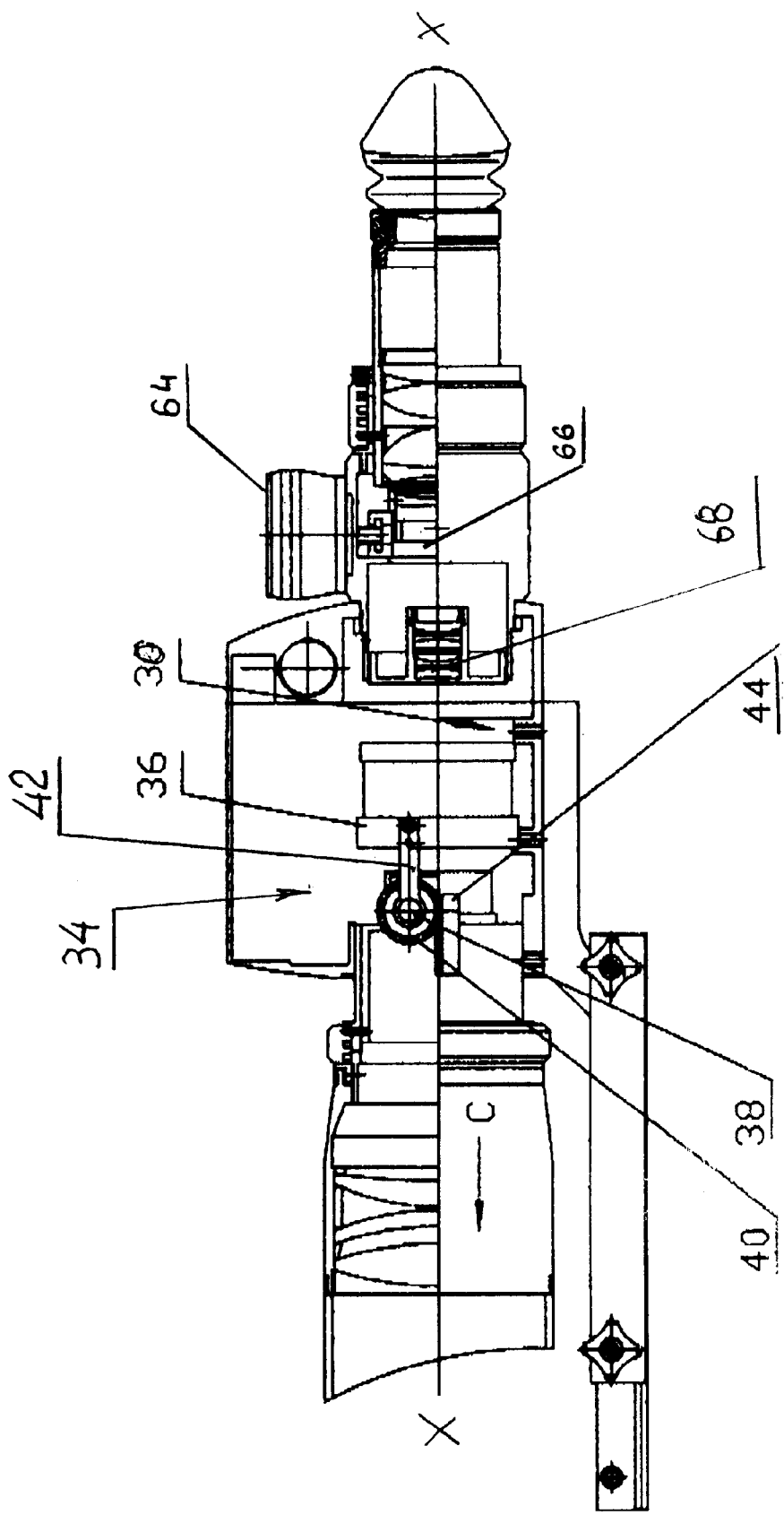
FIG. 3 is the same view as the one shown in FIG. 1 but with the night-sight unit in an operative position.

A self-contained day/night optical sight of the invention is shown in FIGS. 1, 2 and 3, wherein FIG. 1 is a longitudinal sectional view of the self-contained day/night optical sight of the invention in an inoperative position of the night-sight unit, FIG. 2 is a sectional view along the line II—II of FIG. 1, and FIG. 3 is the same view as the one shown in FIG. 1 but with the night-sight unit in an operative position.

As shown in FIGS. 1 and 3, the self-contained day/night optical sight device of the invention, which in general is designated by reference numeral 20, has a sealed sight housing 22 permanently attached to the weapon or to other object (not shown), e.g., to a rifle. Similar to a conventional tubular optical sight, the housing 20 has a tubular portion 24 which contains an objective lens assembly 26 located on one end of the tubular portion 24 and an eyepiece lens assembly 28 located on the opposite end of the tubular portion 24. It is understood that the objective lens assembly 26 and the eyepiece lens assembly 28 are installed on a common optical path X-X at a predetermined distance from each other so that a space 30 is formed between the both. The housing 22 has a hollow radial projection 32 which formed a recess 34 located above the aforementioned space 30. In FIGS. 1 and 3, reference numeral 68 designates an optical image inverter lens assembly.

The same sealed housing 22 pivotally supports a night-vision unit, such as an image-intensifier tube (IIT) 36, which is located in the aforementioned recess 34 and can be turned from this recess 34 to the space 30 around a fixed axle 38 which is rigidly secured to the housing 22. The aforementioned image-intensifier tube 36 is a non-inverting type IIT Model. No. FS9910 produced, e.g., by ITT Corporation, N.Y., USA. In other words, the IIT 36 can be turned in the same plane, which contains optical axis X-X between the position offset from the aforementioned common optical axis X-X, which is shown in FIG. 1, and the position coincident with this optical axis X-X, shown in FIG. 3.

Rotation of the night-vision unit 36 to the working position of FIG. 3 is interlocked with the day-vision optics consisting of the eyepiece lens assembly 28 and the objective lens assembly 26 so that switching of the sight to night-vision conditions will automatically shift the objective lens assembly 26 of the daytime optics back for a distance required for matching both optics. In the illustrated embodiment, the aforementioned interlock is achieved by fitting a gear wheel 40 onto the axle 38 on which the night-vision unit 36 is pivotally installed. As shown in FIGS. 1 and 3, the night-vision unit 36 is supported by a radial arm 42, one end of which is rigidly attached to the axle 38, while the other end rigidly supports the night-vision unit 36. The gear wheel 40 is meshed with a tooth rack 44, which is rigidly attached to the side surface of the objective lens assembly 26 and extends in the longitudinal direction parallel to the optical axis X-X. Positions of the rack 44 and the axle 38 are shown in FIG. 2.

The objective lens assembly 26 is slidingly installed inside the tubular portion 24 of the housing 22. For this purpose, the housing of the objective lens assembly 26 has a pair of splines 46 and 48 (FIG. 2) formed on diametrically opposite peripheral surfaces of the objective lens assembly housing. The splines 46 and 48 slide in guide slots 50 and 52, respectively, formed on the inner surface of the tubular portion 24 of the housing 22. Thus, when the night-vision unit 36 is turned from the position of FIG. 1 to the position of FIG. 3, the gear wheel 40 will move the tooth rack 44 in the direction of arrow C, whereby the objective lens assembly, to which the rack 44 is rigidly connected, will slide inside the tubular portion 24 of the housing 22. More specifically, the splines 46 and 48 will be guided in their respective guide slots 50 and 52.

Fixation of the night-vision unit 36 in the operative and inoperative positions can be carried out, e.g., with the use of the mechanism shown in FIGS. 4 and 5, where FIG. 4 is a view on the part of the optical sight in the direction of arrow B of FIG. 2, and FIG. 5 is a fragmental sectional view along the line V—V in FIG. 4 illustrating a mechanism 54 for locking the rotatable night-vision unit 36 in operative (FIG. 3) and inoperative (FIG. 1) positions. The mechanism shown in FIGS. 4 and 5 comprises a rotatable knob 56 with a spring-loaded snapping pin or ball 58 which is engable with a catching recesses 60 and 62 located in positions corresponding to extreme positions of the night-vision unit 36. It is understood that the end of the axle 38 projects outside the housing 22 and rigidly supports the knob 56, so that manipulation with the knob 56 will rotate the night-vision unit between the operative and inoperative positions in which the unit will be fixed with the locking mechanism 54.

Reference numeral 64 in FIGS. 1 and 3 designate adjustment mechanisms for shifting a reticle 66 (FIGS. 1 and 3) in the plane perpendicular to the optical axis X-X. Since such an adjustement is a conventional technique and is beyond the scope of the present, the description thereof is omitted.

Since both the night-vision and day-vision optics are located in a sealed housing, the lenses are protected from contamination and fogging. The use of a single optical path makes it possible to reduce the weight of the system.

Image intensifier units of latest designs have very small thickness shown in FIG. 1 by symbol L. Therefore arrangement of the image intensifier unit 36 for rotation in the plane that contains optical axis X-X makes it possible to significantly reduce the vertical dimension of the optical sight. In other words, the dimension of the combined day/night sight of the invention does not depend on the aperture ratio of the night-vision device.

Thus it has been shown that the invention provides an integral day/night optical sight, which is simple in construction, small in size, light in weight, utilizes a single optical path with the minimal number of lenses, does not change the temperature of the sight when the night-vision block is installed into the optical path of the daytime optics, does not require disconnection of the night-vision unit from the sight housing, provides reliable operation in day and night mode, and automatically readjust sections of the optical paths when the night-vision unit is switched between the daytime and nighttime operation positions. The self-contained day/night sight of the invention has switchable nighttime optics and daytime optics located in a single housing. The sight does not require the use of any optical compensation units for switching between the daytime and nighttime use.

Although the invention has been shown and described with reference to specific embodiments, it is understood that these embodiments should not be construed as limiting the areas of application of the invention and that any changes and modifications are possible, provided these changes and modifications do not depart from the scope of the attached patent claims. For example, the mechanism for shifting the objective lens can be made in the form of a camming mechanism or a rocker arm. The housing of the sight may have a configuration different from the one shown in the drawings. The sight of the invention may be attached to a binocular device or a geological observation instrument. The sight of the invention can be coupled with various devices used in association with optical sights such as reticle adjustment mechanisms, range finders, image twisters, etc. The switching mechanism for automatic shifting of the objective lens assembly may comprise a friction mechanism.

What is claimed is:

1. A self-contained day/night optical sight comprising:
   a sight housing;
   a complete daytime optics installed in said housing and comprising an objective lens assembly, an eyepiece lens assembly arranged on a common optical axis and spaced from each other to form a space, and an image inverter lens assembly;
   means for moving said objective lens assembly in the direction of said common optical axis inside said housing;
   a night-vision optical device pivotally installed inside said housing with possibility of rotation between a first position in which said night-vision optical device is offset from said common optical axis and a second position in which said night-vision optical device is placed into said space and is optically aligned with said common optical axis;
   a switching mechanism for switching said night-vision optical device between said first position and said second position inside said housing; and
   shifting mechanism for automatic shifting of said objective lens assembly to a position of optical matching with said night-vision optical device when said night-vision optical device is installed in said second position, said mechanism for automatic shifting being interlocked with said mechanism for switching.

2. The self-contained day/night optical sight of claim 1, wherein said sight housing is a sealed housing.

3. The self-contained day/night optical sight of claim 2, wherein said means for moving said objective lens assembly in the direction of said common optical axis comprises longitudinal guide in said sight housing and means on said objective lens assembly for guiding said objective lens assembly along said longitudinal guide.

4. The self-contained day/night optical sight of claim 3, wherein said night-vision optical device is a non-inverting image intensifier unit.

5. The self-contained day/night optical sight of claim 4, wherein said switching mechanism comprises an axle rotatingly installed in said sight housing and having one end projecting outside said sight housing and the other end projecting into said housing, said one end rigidly supporting gripping means for rotating said axle, while said other end rigidly supports said non-inverting night-vision optical device.

6. The self-contained day/night optical sight of claim 5, wherein said shifting mechanism for automatic shifting comprises a gear wheel rigidly attached to said axle and a tooth rack rigidly attached to said objective lens assembly which is in mesh with said gear wheel.

7. The self-contained day/night optical sight of claim 1, further provided with locking means for locking said night-vision optical device in said first position and in said second position.

8. The self-contained day/night optical sight of claim 7, wherein said locking means comprise a first recess on the outer side of said sight housing, a second recess on the outer side of said sight housing, and a spring-loaded locking member on said switching mechanism for engagement with said first recess, when said night-vision optical device is switched to said first position and for engagement with said second recess, when said night-vision optical device is switched to said second position.

9. The self-contained day/night optical sight of claim 6, further provided with locking means for locking said image intensifier unit in said first position and in said second position.

10. The self-contained day/night optical sight of claim 9, wherein said locking means comprise a first recess on the outer side of said sight housing, a second recess on the outer side of said sight housing, and a spring-loaded locking member on said gripping means for engagement with said first recess, when said night-vision optical device is switched to said first position and for engagement with said second recess, when said night-vision optical device is switched to said second position.

11. A self-contained day/night optical sight comprising:
   a sealed sight housing;
   a complete daytime optics installed in said sealed housing and comprising an objective lens assembly, an eyepiece lens assembly arranged on a common optical axis and spaced from each other to form a space, and an image inverter lens assembly;
   means for moving said objective lens assembly in the direction of said common optical axis inside said housing;
   an image intensifier unit rigidly attached to a link pivotally installed inside said housing on a pivot axle with possibility of rotation between a first position in which said image intensifier unit is offset from said common optical axis and a second position in which said image intensifier unit is placed into said space and is optically aligned with said common optical axis;
   a switching mechanism for switching said image intensifier unit between said first position and said second position inside said housing; and
   shifting mechanism for automatic shifting of said objective lens assembly to a position of optical matching with said image intensifier unit when said image intensifier unit is installed in said second position, said shifting mechanism for automatic shifting being interlocked with said mechanism for switching.

12. The self-contained day/night optical sight of claim 11, wherein said means for moving said objective lens assembly in the direction of said common optical axis comprises longitudinal guide slot in said sealed sight housing and at least one projecting member on said on said objective lens assembly inserted into said guide slot for guiding said objective lens assembly along said longitudinal slot.

13. The self-contained day/night optical sight of claim 12, wherein said pivot axle has one end projecting outside said sealed sight housing and the other end projecting into said sealed housing, said one end rigidly supporting a handle for rotating said pivot axle, while said other end is rigidly connected to said link.

14. The self-contained day/night optical sight of claim 11, wherein said shifting mechanism for automatic shifting comprises a gear wheel rigidly attached to said pivot axle and a tooth rack rigidly attached to said objective lens assembly which is in mesh with said gear wheel.

15. The self-contained day/night optical sight of claim 13, wherein said shifting mechanism for automatic shifting comprises a gear wheel rigidly attached to said pivot axle and a tooth rack rigidly attached to said objective lens assembly which is in mesh with said gear wheel.

16. The self-contained day/night optical sight of claim 11, further provided with locking means for locking said image intensifier unit in said first position and in said second position.

17. The self-contained day/night optical sight of claim 16, wherein said locking means comprise a first recess on the outer side of said sealed sight housing, a second recess on the outer side of said sealed sight housing, and a spring-loaded locking member on said handle for engagement with said first recess, when said image intensifier unit is switched to said first position and for engagement with said second recess, when said image intensifier unit is switched to said second position.

18. A self-contained day/night optical sight comprising:
   a sight housing;
   a complete daytime optics installed in said housing and comprising an objective lens assembly, an eyepiece lens assembly arranged on a common optical axis and spaced from each other to form a space, and an image inverter lens assembly; and
   a night-vision
   a night-vision optical device pivotally installed inside said housing with possibility of rotation in a plane that contains said common optical xis between a first position in which said night-vision optical device is offset from said common optical axis and a second position in which said night-vision optical device is placed into said space and is optically aligned with said common optical axis.

19. The self-contained day/night optical sight further comprising:
   a switching mechanism for switching said night-vision optical device between said first position and said second position inside said housing; and
   shifting mechanism for automatic shifting of said objective lens assembly to a position of optical matching with said night-vision optical device when said night-vision optical device is installed in said second position, said mechanism for automatic shifting being interlocked with said mechanism for switching.

20. The self-contained day/night optical sight of claim 19, wherein said sight housing is a sealed housing.

21. The self-contained day/night optical sight of claim 20, wherein said means for moving said objective lens assembly in the direction of said common optical axis comprises longitudinal guide in said sight housing and means on said objective lens assembly for guiding said objective lens assembly along said longitudinal guide.

22. The self-contained day/night optical sight of claim 21, wherein said night-vision optical device is an image intensifier unit.

23. The self-contained day/night optical sight of claim 22, wherein said switching mechanism comprises an axle rotatingly installed in said sight housing and having one end projecting outside said sight housing and the other end projecting into said housing, said one end rigidly supporting gripping means for rotating said axle, while said other end rigidly supports said night-vision optical device.

24. The self-contained day/night optical sight of claim 23, wherein said shifting mechanism for automatic shifting comprises a gear wheel rigidly attached to said axle and a tooth rack rigidly attached to said objective lens assembly which is in mesh with said gear wheel.

25. The self-contained day/night optical sight of claim 18, further provided with locking means for locking said night-vision optical device in said first position and in said second position.

26. The self-contained day/night optical sight of claim 25, wherein said locking means comprise a first recess on the outer side of said sight housing, a second recess on the outer side of said sight housing, and a spring-loaded locking member on said switching mechanism for engagement with said first recess, when said night-vision optical device is switched to said first position and for engagement with said second recess, when said night-vision optical device is switched to said second position.

* * * * *